US012749011B2

(12) United States Patent
Ward et al.

(10) Patent No.: US 12,749,011 B2
(45) Date of Patent: Sep. 29, 2026

(54) DISTRIBUTED COMPUTER SYSTEM AND METHOD OF OPERATION THEREOF

(71) Applicant: UVUE LTD, Bury St Edmunds (GB)

(72) Inventors: Jonathan Ward, Bury St Edmunds (GB); Marcin Abram, Bury St Edmunds (GB); Daniel Honerkamp, Bury St Edmunds (GB)

( * ) Notice: Subject to any disclaimer, the term of this patent is extended or adjusted under 35 U.S.C. 154(b) by 782 days.

(21) Appl. No.: 18/002,271

(22) PCT Filed: Jun. 21, 2021

(86) PCT No.: PCT/IB2021/055429
§ 371 (c)(1),
(2) Date: Dec. 18, 2022

(87) PCT Pub. No.: WO2021/260517
PCT Pub. Date: Dec. 30, 2021

(65) Prior Publication Data

US 2023/0316127 A1 Oct. 5, 2023

(30) Foreign Application Priority Data

Jun. 22, 2020 (EP) .................................... 20020289
Sep. 7, 2020 (EP) .................................... 20020400

(51) Int. Cl.
*G06N 20/00* (2019.01)
*G06Q 20/02* (2012.01)
*H04L 9/00* (2022.01)

(52) U.S. Cl.
CPC ............. *G06N 20/00* (2019.01); *G06Q 20/02* (2013.01); *H04L 9/008* (2013.01); *G06Q 2220/00* (2013.01)

(58) Field of Classification Search
CPC .... G06N 20/00; G06Q 20/02; G06Q 2220/00; H04L 9/008; G06F 9/466
See application file for complete search history.

(56) References Cited

U.S. PATENT DOCUMENTS 11,218,293 B2 * 1/2022 Manamohan .......... G06N 3/006
2019/0236598 A1 * 8/2019 Padmanabhan ...... G06Q 20/389
(Continued)

FOREIGN PATENT DOCUMENTS

WO 2020030936 A1 2/2020
WO 2020035831 A1 2/2020

OTHER PUBLICATIONS

Felix Sattler, Klaus-Robert Müller, Wojciech Samek, Clustered Federated Learning: Model-Agnostic Distributed Multi-Task Optimization under Privacy Constraints [retrieved on Sep. 26, 2025] Retrieved from the Internet <URL: https://arxiv.org/abs/1910.01991> (Year: 2019).*

(Continued)

*Primary Examiner* — Hal Schnee
*Assistant Examiner* — Alfredo Campos
(74) *Attorney, Agent, or Firm* — RC Trademark Company

(57) ABSTRACT

Disclosed is a distributed computer system that includes a plurality of worker nodes that are coupled together via a data communication network to exchange data therebetween, wherein collective learning of the worker nodes is managed within the distributed computer system. The distributed computer system comprises a data processing arrangement operable to cluster the plurality of worker nodes into one or more clusters, wherein worker nodes of a given cluster train a computing model by employing a respective secondary distributed ledger. The collective learning from the plurality of worker nodes is coordinated using the distributed ledger arrangement.

18 Claims, 5 Drawing Sheets

Collective Learning Protocol

(56) References Cited

U.S. PATENT DOCUMENTS

2019/0334708 A1* 10/2019 Carpov ................ H04L 9/3093
2019/0370334 A1* 12/2019 Bhowmick .......... G06F 40/242

OTHER PUBLICATIONS

Amritraj Singh, Kelly Click, Reza M. Parizi, Qi Zhang, Ali Dehghantanha, Kim-Kwang Raymond Choo, Sidechain technologies in blockchain networks: An examination and state-of-the-art review, Journal of Network and Computer Applications, vol. 149, 2020 , 102471, ISSN 1084-8045 (Year: 2019).*

Ambili, K. N., M. Sindhu, and M. Sethumadhavan. "On Federated and Proof Of Validation Based Consensus Algorithms In Blockchain." IOP Conference Series. Materials Science and Engineering. vol. 225. No. 1. IOP Publishing, 2017. (Year: 2017).*

6. Boneh, Dan, et al. "Verifiable delay functions." Annual international cryptology conference. Cham: Springer International Publishing, 2018. (Year: 2018).*

P. Gai, A. Kiayias and D. Zindros, "Proof-of-Stake Sidechains," 2019 IEEE Symposium on Security and Privacy (SP), San Francisco, CA, USA, 2019, pp. 139-156, doi: 10.1109/SP.2019.00040 . . . (Year: 2019).*

Ghosh, Avishek, et al. "An Efficient Framework for Clustered Federated Learning." arXiv preprint arXiv:2006.04088 (2020) (Year: 2020).*

Chiraag et al. published "Gazelle: A Low Latency Framework for Secure Neural Network Inference", in Cornell University Library, 201 Olin Library Cornell University Ithaca, NY 14853 onJan. 16, 2018, 17 pages.

Shayan et al. published "Biscotti: A Ledger for Private and Secure Peer-to-Peer Machine Learning", in The University of British Columbia (Vancouver) on Dec. 12, 2019, Version 4, 20 pages.

Liu et al. published "Blockchain and Machine Learning for Communications and Networking Systems", in IEEE Communications Surveys & Tutorials, vol. 22, No. 2, Second Quarter on Feb. 24, 2020, pp. 1392-1431.

Extended European Search Report issued in EP Patent Application No. EP20020400.6, on Mar. 1, 2021, 12 pages.

Notification of Transmittal of the International Search Report and the Written Opinion of the International Searching Authority mailed in International Patent Application PCT/IB2021/055429, on Oct. 12, 2021, 13 pages.

* cited by examiner

DISTRIBUTED COMPUTER SYSTEM AND METHOD OF OPERATION THEREOF

TECHNICAL FIELD

The present disclosure relates generally to systems for managing information related to recordal of entries in a distributed ledger; and more specifically, to methods and systems for distributed computer systems that enable training of a computing model.

BACKGROUND

Machine learning (ML) methods, such as neural networks, use training data to build models that perform some useful task such as transcribing the words in spoken language or recognising the objects that exist within an image. These models, and particularly deep learning algorithms, typically require very large amounts of data. This data may be distributed among many different devices, and it is often not feasible to aggregate all of this data in a single location due to consumer preferences or regulations that protect the privacy and security of individuals. It is also often the case that many different parties have an interest in building a shared machine learning algorithm but are unable or unwilling to share the raw data with each other.

The majority of existing approaches to the collective learning problem typically rely on a trusted central party to aggregate all information into a single global model. This is a technique known as federated learning, and has been used successfully at companies such as Google and Apple to build machine learning models from consumers' data without needing to directly access and store their personal data. This is achieved by obtaining updates to a machine learning model by training it on data that is stored locally on the consumer's devices. These model updates are uploaded to a central server and aggregated to improve a global model. This approach has been used successfully in domains such as speech recognition and predictive text.

A limitation of this approach is that it puts control of the model in the hands of a single party. This makes many federated learning techniques unsuitable for more complex scenarios such as, for example, health data held by many independent providers.

There have been relatively few approaches that attempt to solve the more general collective learning problem involving multiple parties involved in training and aggregating machine learning models. Notable examples include *Biscotti* (Shayan, M., Fung, C., Yoon, C. J. M., & Beschastnikh, I. (2018). *Biscotti: A Ledger for Private and Secure Peer-to-Peer Machine Learning*. Retrieved from http://arxiv.org/abs/1811.09904) which uses a ledger along with a verifiable random function (VRF) to select aggregators and write model updates onto the blockchain. It was shown that *Biscotti* is effective at training algorithms for the MNIST (Modified National Institute of Standards and Technology) benchmark dataset even in the presence of adversaries deliberately attempting to "poison" the model, whilst also ensuring the privacy of data held by the nodes. Other studies also deal with the issue of incentivizing participants in federated learning protocols with a view towards using public blockchain networks for mediating these interactions.

While technically accomplished, existing studies do not deal with an important issue that is likely to prevent successful deployment of federated learning algorithms involving data sets that are held by different stakeholders in areas such as healthcare and financial services. A key issue that the participants in these protocols face is that it is unclear whether another party's data (or multiple parties in a collective learning task) is useful for the problem that they wish to solve. Most machine learning algorithms assume that training and test data will be independent and identically distributed. This means that the data points are sampled randomly from some parent distribution, and that this distribution does not change over time or with respect to partitioning of the data into test and training sets.

It has frequently been observed that ML algorithms trained on a particular data set generalize poorly to other data that have slightly differing properties. This reflects a fragility or brittleness of most modern ML algorithms. This is likely to be a particular issue for healthcare settings and the biotech industry, where subtle differences in procedures such as medical imaging can lead to highly heterogeneous data. A similar issue could also apply to other areas such as financial services where variation in, for example, recording of transaction histories could lead to differences in the fraud detection algorithms used by different organizations.

SUMMARY

The present invention introduces a decentralised, collective learning platform which allows devices (nodes) to learn statistical models using information from all participants (nodes) without sharing their local data directly and without relying on a central party (central node). This platform consists of a distributed ledger, a collective data structure and devices with a local data storage and processor. The distributed ledger serves as a platform to initialise and manage the collective data structure in untrusted settings. It also provides participants with reputation information, a verifiable random function and a mechanism to incentivise the actions of the participants within a decentralised system.

The present disclosure seeks to provide a distributed computer system that includes a plurality of worker nodes that are coupled together via a data communication network to exchange data therebetween, wherein collective learning of the worker nodes is managed within the distributed computer system. The aforementioned distributed computer system enables training of a computing model, wherein the worker nodes that train the computing model do not need to share training datasets therebetween.

In one aspect, there is provided a distributed computer system that includes a plurality of worker nodes that are coupled together via a data communication network to exchange data therebetween, wherein the worker nodes include computing arrangements and local databases to process and store data therein, wherein the system further comprises a distributed ledger arrangement for coordinating the system, wherein the system is configured to execute at least one smart contract using the distributed ledger arrangement a data processing arrangement configured to cluster the plurality of worker nodes into one or more clusters, at least one secondary distributed ledger for coordinating collective learning of the worker nodes configured to implement at least one computer protocol for the collective learning of the worker nodes wherein the worker nodes of a given cluster are configured to train at least one computing model using information comprised in the distributed ledger;

Optionally, the data processing arrangement is configured to cluster the plurality of worker nodes into one or more clusters based on estimated generalization performance of a shared classifier on a task associated with the worker nodes. Following completion of the collective learning protocol, participants are clustered into groups with shared model parameters based on the estimated generalization performance The system may initiate the secondary distributed ledger by employing at least one of: staking of tokens in the distributed ledger, smart contract, off-chain contractual agreements.

Optionally, the system is configured to employ homomorphic encryption techniques to pre-cluster worker nodes prior to training of the computing model to provide compatible computing models to each of the one or more clusters.

Optionally, each of the secondary distributed ledgers is configured to store information pertaining to the respective computing model, worker nodes associated therewith, and a contribution of each of the worker nodes in their respective cluster in relation to training the respective computing model.

Optionally, the data processing arrangement is configured to validate a given block in the distributed ledger arrangement when the given block is referenced by a block that has been notarised by a majority of the plurality of worker nodes.

Optionally, the data processing arrangement is configured to employ verifiable delay functions to space the timing of block production according to a priority of each worker node within a given cluster.

The distributed computer system and the method provided in the present disclosure enable implementation of training of the computing model while maintaining the privacy of the data sets that are held by the different worker nodes and to also deal with malicious or adversarial behaviour from a subset of the worker nodes. Furthermore, due to usage of secondary distributed ledgers, model parameters and updates are not required to be stored on distributed ledger arrangements, thereby reducing operational costs significantly.

In another aspect, there is provided a method for (namely a method of) operating a distributed computer system that includes a plurality of worker nodes that are coupled together via a data communication network to exchange data therebetween, wherein the worker nodes include computing arrangements and local databases to process and store data therein, wherein operation of the distributed computer system is coordinated by employing a distributed ledger arrangement, wherein the distributed computer system is arranged to execute at least one smart contract via use of the distributed ledger arrangement, characterized in that the method includes providing the distributed computer system with a data processing arrangement configured to cluster the plurality of worker nodes into one or more clusters, wherein worker nodes of a given cluster train at least one computing model by employing at least one respective secondary distributed ledger, and wherein the collective learning from the plurality of worker nodes is coordinated using the distributed ledger arrangement.

Optionally, the method comprises clustering the plurality of worker nodes into one or more clusters based on estimated generalization performance of a shared classifier on a task associated with the worker nodes.

Optionally, the method comprises initiating at least one secondary distributed ledger by employing at least one of: staking of tokens in the distributed ledger arrangement, smart contract logic, off-chain contractual agreements.

Optionally, the method comprises employing homomorphic encryption techniques to pre-cluster worker nodes prior to training of the computing model to provide compatible computing models to each of the one or more clusters.

Optionally, each of the secondary distributed ledgers stores information pertaining to the respective computing model, worker nodes associated therewith, and contribution of each of the worker nodes in the respective cluster to train the respective computing model.

Optionally, the method comprises validating a given block in the distributed ledger arrangement when the given block is referenced by a block that has been notarised by a majority of the plurality of worker nodes.

Optionally, the method comprises employing verifiable delay functions to space the timing of block production according to a priority of each worker node within a given cluster.

Optionally the method comprises checking finality of each chain and relaying the information between the chains.

Additional aspects, advantages, features and objects of the present disclosure would be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
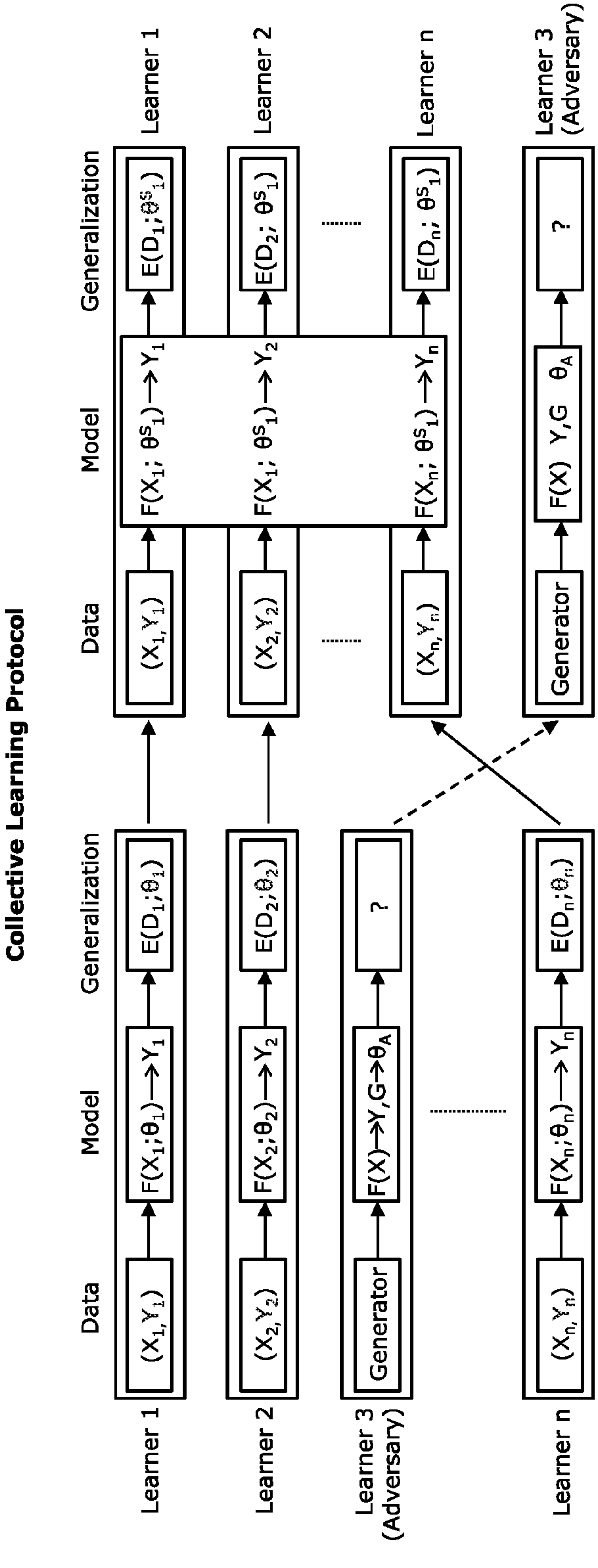
FIG. 1 is a schematic illustration of collective learning protocol, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The distributed computer system and the method provided in the present disclosure enables implementation of training of the computing model while maintaining the privacy of the data sets that are held by the different worker nodes and to also deal (prevent) with malicious or adversarial behaviour from a subset of the worker nodes. Furthermore, due to usage of secondary distributed ledgers (known as side-chains in blockchain technology) model parameters and updates are not required to be stored on distributed ledger arrangements, thereby reducing operational costs significantly. In the present context, the reduction of operational costs means a reduction of computational time (burden), data transfer in between nodes, computer memory and energy spent, which is significant in distributed ledgers with relatively high amount of node participants. By consequence, monetary costs are also reduced in systems where such monetary costs are associated with the operational costs.

Moreover, the present invention does not require a central authority and therefore, worker nodes do not have to give control of the model thereto.

The present disclosure enables multiple independent stakeholders to securely build collective learning models for subtly different tasks. The method described herein only requires sharing of model updates instead of the underlying data used to train the model, thereby maintaining privacy. Such limited sharing of information significantly reduces communication costs by allowing individual validators to focus communications on other validators that are providing relevant information. The system and method described herein are scalable to very large numbers of worker nodes. Furthermore, cryptographically secure random beacon reduces the influence that any single worker node has on the progression of the collective learning task. The interaction with a public distributed ledger arrangement provides the Collective Learning Side-Chain (CLSC) with the security and availability for storing important information such as the consensus rules, stake lockups and reward calculations.

The worker nodes include computing arrangements that are operable to respond to, and processes instructions and data therein. The computing arrangements may include, but are not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the computing arrangements can be one or more individual processors, processing devices and various elements associated with a processing device that may be shared by other processing devices. Additionally, the computing arrangements are arranged in various architectures for responding to and processing the instructions that drive the system.

The computing arrangements are processing devices that operate automatically. In such regard, the computing arrangements may be equipped with artificial intelligence algorithms that are configured to respond to and to perform the instructions that drive the system based on data learning techniques. The computing arrangements devices capable of automatically responding and of performing instructions based on input provided from one or more users (namely, the worker nodes participating in the system). The worker nodes further include local databases to store data therein. Furthermore, the collective learning of the worker nodes is managed within the distributed computer system. Notably, the computing model is trained between the plurality of worker nodes in a manner that the intermediary computing models that have been partially trained are shared between the worker nodes and resources of worker nodes are utilized productively.

Moreover, the plurality of worker nodes are communicably coupled to each other via the data communication network. The data communication network allows for communication among the plurality of worker nodes. In other words, each of the plurality of worker nodes is capable of communicating with other worker nodes via the data communication network in order to facilitate training of the computing model. Notably, the data communication network refers to an arrangement of interconnected, programmable and/or non-programmable components that, when in operation, facilitate data communication between one or more electronic devices and/or databases. Furthermore, the data communication network may include, but is not limited to, a peer-to-peer (P2P) network, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system. Additionally, the data communication network employs wired or wireless communication that can be carried out via one or more known protocols.

The operation of the distributed computer system is coordinated by employing the distributed ledger arrangement. Herein, the term "distributed ledger arrangement" refers to a ledger (such as a database) comprising entries recording operations and/or contracts (preferably smart contracts), with a timestamp. According to the common knowledge in the field of computer science and distributed ledgers, smart contracts may be one or more computer algorithms or a transaction protocols, where these may be executed via computer programs, respectively intended to automatically execute events or actions according to agreed terms (the contract terms). Smart contracts may also control, record or document such events or actions according to the terms agreed, for example agreed on a contract.

Pursuant to embodiments of the present disclosure, the distributed ledger arrangement refers to a database of the entries or blocks. Moreover, the distributed ledger arrangement is consensually shared and synchronised in a decentralised form across the plurality of worker nodes. In this regard, the ledger is consensually shared and synchronised across multiple sites, institutions or geographies. Such worker nodes can be established across different locations. More than one worker node may be present within a device such as computer. Beneficially, the distributed ledger arrangement eliminates the need of a central authority to maintain the distributed ledger arrangement and protect it against manipulation. Specifically, the entries or blocks in the distributed ledger arrangement are monitored publicly, thereby making the distributed ledger arrangement robust against attacks. Notably, the worker nodes may be independent entities that may become a part of the distributed computer system and provide resources thereof in exchange for a reward provided as a compensation for the resources used for training the computing model.

The distributed ledger arrangement is a database that is replicated across many computers and/or geographical locations. The worker nodes that maintain this shared database converge on a consensus state without requiring any centralized authority. Most modern ledger implementations maintain two data structures; the first is an ordered list of transactions while the second is a state database, which maintains records of state variables that are derived from the transaction set. At their simplest, this state database can represent credits associated with user accounts, which are modified over time by the time-ordered append-only record of transactions.

The first component is the ledger itself and could be implemented using a blockchain, a transaction chain, a DAG, a Tangle or any other method from which absolute or partial temporal ordering can be established. The second component could be a key-value store, a Git repository, an ordinary database, file system, memory or any other media capable of storing data. There are many different blockchain implementations, including Bitcoin, Litecoin, Dogecoin, BigchainDB, Hyperledger Fabric, Hyperledger Sawtooth Lake, Ethereum, Neo and numerous others.

It will be appreciated that the plurality of worker nodes (namely, peers) in the distributed ledger arrangement may access each of the entries in the distributed ledger arrangement and may own an identical copy of each of the entries. Notably, an alteration made to the distributed ledger arrangement is reflected almost instantly to each of the plurality of worker nodes. Subsequently, an addition of an entry is completed when all or some of the plurality of worker nodes perform a validation with respect to the addition. In such case, the entry is recorded (namely, added) in the distributed ledger arrangement in an immutable form when at least a threshold number of worker nodes from the plurality of worker nodes reach a consensus that the entry is valid. Alternatively, recording of the entry or the block is denied when the threshold number of worker nodes reach a consensus that the entry is invalid. In an example, the threshold number of worker nodes to reach a consensus may be more than fifty percent of the plurality of worker nodes. Optionally, information in the distributed ledger arrangement is stored securely using cryptography techniques.

The distributed ledger arrangement is arranged to execute at least one smart contract via use of the distributed ledger arrangement. Herein, the term "smart contract" refers to a computer protocol implemented using the distributed ledger arrangement comprising information required to coordinate the collective learning of the worker nodes by the distributed computer system. Moreover, the smart contract permits trusted execution thereof without involving a central authority, legal system, or externally enforced mechanisms. Pursuant to the embodiments of the present disclosure, the smart contract is employed to coordinate learning between the worker nodes and to ensure that the learning parameters relating to training of the computing model are provided to the plurality of worker nodes.

The distributed computer system comprises a data processing arrangement. Notably, the data processing arrangement is communicably coupled to the plurality of worker nodes in the distributed computer system. Herein, the data processing arrangement is operable to (namely configured to) track operation of each of the worker nodes. Furthermore, the data processing arrangement may include, but is not limited to, a microprocessor, a microcontroller, a complex instruction set computing (CISC) microprocessor, a reduced instruction set (RISC) microprocessor, a very long instruction word (VLIW) microprocessor, an artificial intelligence (AI) computing engine based on hierarchical networks of variable-state machines, or any other type of processing circuit. Furthermore, the data processing arrangement can be one or more individual processors, processing devices and various elements associated with a processing device that may be shared by other processing devices.

Furthermore, most public distributed ledger arrangements store transactions indefinitely, which further increases the cost of storing large amounts of data on-chain. This storage cost precludes most applications of machine learning on public distributed ledger arrangements. Similarly, the inefficient and single-threaded execution of existing distributed ledger arrangements leads to on-chain computation being too expensive for intensive calculations such as those required by most machine learning algorithms.

One approach to circumventing the limitations of public distributed ledger arrangements are secondary distributed ledgers (namely, side-chains). These are distinct ledger networks that communicate with the public distributed ledger arrangement. This communication with the main ledger provides two principal benefits. The first is that digital tokens, also known as cryptocurrency, that are represented on the main ledger can be used to incentivize activities on the side-chain. This enables payments for contributing positively towards collective learning tasks, slashing of staked funds for malicious acts and for these behaviours to be used to establish reputations for different actors in the network. The other benefit of running a side-chain is that the security and immutability of the side-chain can be guaranteed by recording some events that occur there, such as the production of blocks, on the main chain, the main chain being the public distributed ledger. In instances, the public distributed ledger may be referred to as the primary chain or the main chain.

The other advantages of secondary distributed ledgers are that the full state does not need to be recorded indefinitely, and that these chains can also be specialised so that expensive computations can be performed without impairing the many other activities that are typically performed on public blockchains. Furthermore, permissioned blockchains are distributed ledger arrangements that involve some kind of external verification process for parties to operate nodes in the network. It is technically straightforward to modify most implementations of public blockchains to run in permissioned mode. The advantage of permissioned chains is that external off-chain governance through contracts can be used to define the behaviour of actors in the network, and is particularly appropriate for consortia of businesses, charities or governments.

An important component of many distributed ledger arrangements are verifiable random functions. These functions can involve using cryptographic calculations between many parties, known in the field as multi-party computation (MPC), to generate unbiasable (without bias) random values that can be used to allocate resources or tasks to different individuals at different times. This is generally known as "Decentralized Random Beacons (DRBs). In the present invention, this technology is used in collective learning to decide on which actor in the network should perform the next action that contributes to the completion of a multi-party learning task. The unpredictability and multi-party nature of DRBs makes collusion between the different nodes of the system more difficult and increase the security of the protocol.

The system and method disclosed herein is applicable to blockchain technology. An intrinsic advantage of blockchain technology is that all participants have an identity specified by public key. This enables the different participants to set-up secure, encrypted channels with each other. These channels can be used for a variety of purposes including sharing data or transferring tokens.

Furthermore, in the present invention the system may employ Inter-Planetary File System (IPFS), which are designated to instead support content-addressable data that can be stored redundantly in many different physical locations. This increases availability of data as well as robustness by removing the possibility of a single point of failure preventing data from being accessible. The IPFS is also complementary to the state-channel and cryptocurrency approaches as parties are also able to redundantly and immutably store data for access at a later date. For example, a redundancy (i.e. replication) of the data can be controlled in a more fine-grained way (i.e. with a higher ratio between of computational tasks and communication between parties or nodes, thus breaking down computational tasks into smaller tasks) than on-chain data, although the availability guarantees, and security is reduced compared with on-chain storage.

Moreover, in distributed learning optimises statistical models of data that is stored on a large number of devices that are physically or logically separated from each other. These devices consist of hardware executing training steps on their local data and only send updates or model weights to other devices. The present invention may employ a central parameter server and scheduler to manage the individual devices.

The present disclosure further employs homomorphic encryption (HE) that are a diverse family of cryptographic techniques that allow mathematical operations to be performed on encrypted data without revealing anything about the underlying data itself to the party that performs the calculations.

The present disclosure introduces a decentralised, collective learning platform which allows computing arrangements to learn statistical models using information from all worker nodes without sharing their local data directly and without relying on a central party. This platform consists of a distributed ledger, a collective data structure and devices with a local data storage and processor. The distributed ledger serves as a platform to initialise and manage the collective data structure in untrusted settings. It also provides worker nodes with reputation information, a verifiable random function and a mechanism to incentivize the actions of the worker nodes within a single, decentralised system.

In all of the examples presented in the disclosure, it is assumed that the setting is supervised learning with n worker nodes, equipped with a local data storage and processor. The logic can also be trivially extended to unsupervised and reinforcement learning, and other more complex machine learning contexts such as transfer learning and semi-supervised learning. It is further assumed that at the start of the protocol, there are a collection of parties with disjoint, labelled data sets and the capacity to train a machine learning algorithm. The goal is that, by following the protocol, these different parties will be clustered into groups with shared models such that each honest worker nodes has an improved performance on their task.

Each worker node, indexed by $i \in [0, n)$ has a dataset $(X_i, Y_i)$, sampled from a distribution $D_i$ stored locally. In supervised learning, $X_i$ is a matrix where each row is a real-valued vector representing a single training example and the $Y_i$ is a matrix of labels or regressor values. We assume each worker node has trained a statistical model $f(X_i; w_i)$ parameterised by $w_i$ that minimises the estimated generalisation error, $\hat{E}(D_i; w_i)$, over the distribution $D_i$. An illustrative example of this set-up would be a consortium of hospitals that have a local data set of X-ray images from patients with labels {cancer, no cancer} manually annotated by human experts.

Following completion of the protocols, the learners will be partitioned into $m \le n$ groups, indexed by $j \in [0, m)$ with shared models parameterised by $$w_j^s$$

and where the estimated generalization error for each worker node is reduced or is unchanged so that $$\hat{E}(D_i; w_j^s) \le \hat{E}(D_i; w_i) \forall i.$$

This implies that, following training, adversaries will not have succeeded in damaging the models of honest worker nodes. This process explained in conjunction with FIG. 1.

The present disclosure provides two different modes for collective learning. The first mode involves the use of homomorphic encryption (HE) techniques and an on-chain consensus algorithm to pre-cluster the worker nodes into groups using pre-trained (and potentially simplified) versions of their local models. In the second mode, the worker nodes are clustered dynamically during the training of the shared model. The second mode uses a combination of model aggregation and distributed ledger arrangement consensus protocols to group worker nodes according to the similarity of their tasks. These different modes can be used in isolation of each other or in combination.

The present disclosure provides a distributed computer system that enables implementation of (i) a temporary common data structure (a side-chain) that overcomes or reduces the cost and computational burden of public blockchains (ii) the use of a public distributed ledger arrangement for open participation, reputation management and algorithmic reward attribution and payout, (iii) a consensus scheme that enables worker nodes to collectively train a shared machine learning model using a distributed ledger arrangement (iv) variants of these consensus schemes that enable many parties to solve a collective multi-task learning problem and (v) schemes for combining homomorphic encryption (HE) with multi-task learning for multiple stakeholders. In all of these examples, these systems self-organise without requiring coordination by a trusted central authority.

Hereinafter, the present disclosure describes the base system of networked worker nodes that is used to train collective learning models. We then go on to describe different consensus protocols that can be operated using this architecture to train collective multi-task learning models between multiple worker nodes.

Figure 2:
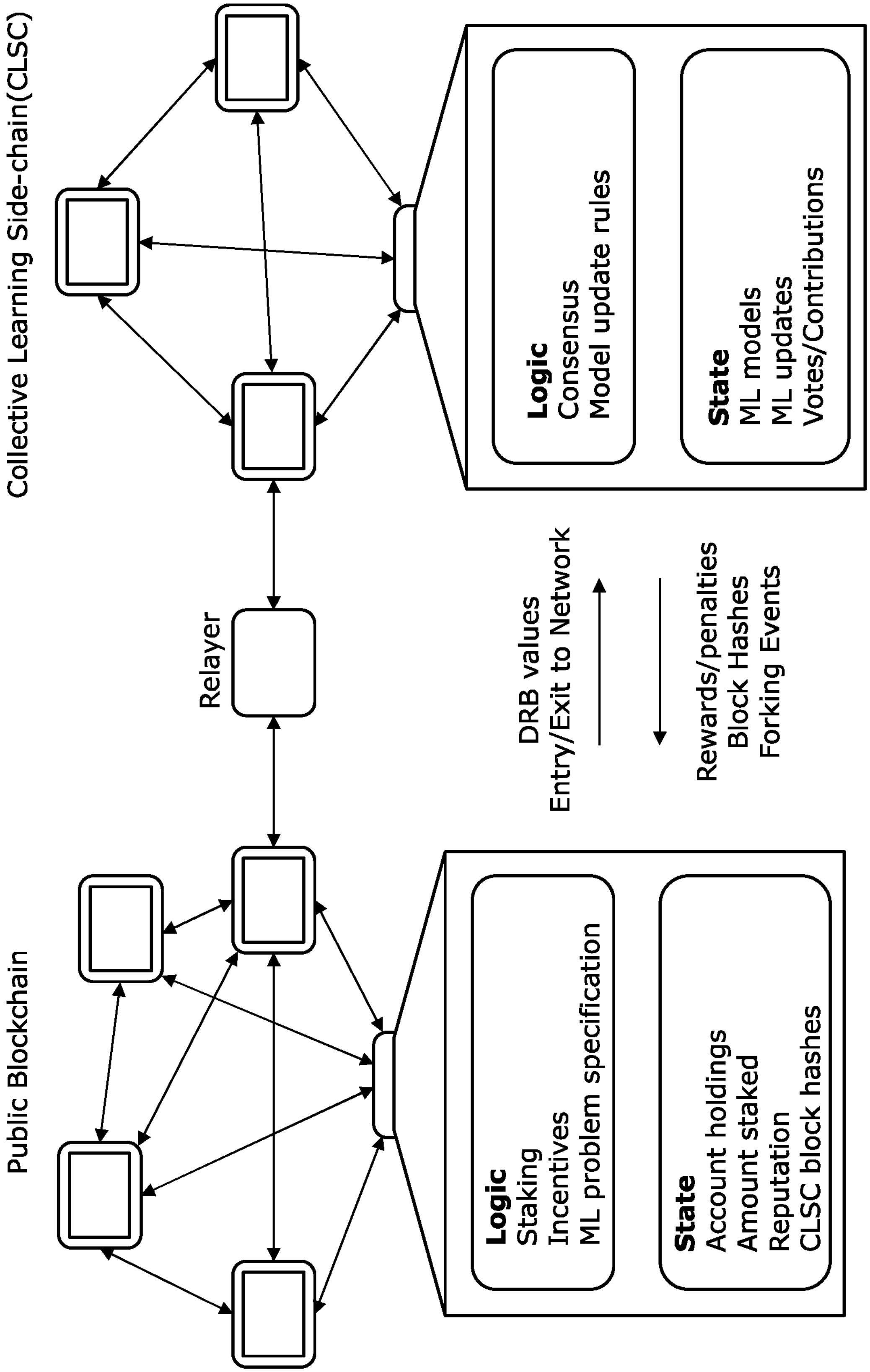
FIG. 2 is a schematic illustration depicting a collective learning system built using interoperability between a public blockchain and a side chain, in accordance with an embodiment of the present disclosure.

The distributed computer system is implemented using a public distributed ledger arrangement has been initiated by a collection of worker nodes, which we now concretely refer to as validators. The set of all validators is referred to as a committee. By either the staking of tokens or smart contract logic or off-chain contractual agreements or some combination of these different mechanisms a side-chain (namely, a secondary distributed ledger) has been initiated, which we refer to as a collective learning side-chain (CLSC). The staking of tokens will typically have been deposited on the public main chain, which can be used to make permanent records of events that take place on the CLSC. The architecture of the system along with stores and flows of information are shown in FIG. 2.

It will be appreciated that at the start of training, the worker nodes construct a genesis block that records the address and public key of all the validators on the CLSC, along with the properties of the ML model. Typically, this model involves a function, f(·), parameterized by a vector of weights, w, that maps the input data to the to the output domain $f(X, w) \rightarrow Y$, which represent the labels or regressor values of interest. The model parameters are initialized with zeros, $w^0=\{0\}^d$ where d is the model dimensionality. The random beacon value is then used to select a validator $i \in [0, n)$ to produce the first update to the model parameters $\Delta w^1$. These updates can be applied sequentially to improve the model over time using the rule $w^t=w^{t-1}+\Delta w^t$. The first update will typically be drawn from a random distribution, such as uniform distribution on an interval $\Delta w^1 \in [-1, 1]^d$, but other alternatives are possible. After locally generating the weight values, the validator will communicate it with the other validators in the network, potentially as a series of transactions, and publish a block containing a digest or hash of the aggregated weight update.

In the first embodiment, we deal with the single-task learning case to motivate the more complicated multi-task learning schemes. A common feature of many distributed ledger arrangement consensus schemes is the use of digital signatures to notarize the blocks generated by other validators to signify (i) that the signer has received the block, and (ii) that the block is valid. If a simple (more than half) or two-thirds majority of signatures are received, then the block progresses towards being "accepted" as valid by the rules of the consensus scheme. In this design, we use a simple scheme, similar to the Dfinity protocol, where blocks become accepted as valid (also known as finalized) when they are referenced by a block that is notarized by a simple majority of the validators.

One innovative aspect of the present invention is that, alongside the block hash, each validator, indexed by i, also signs a variable, v, that reflects the error of the model on their local data set $\hat{E}(D_i; w^t)$. The simplest rule involves the validator making a positive vote if the weight update leads to an improvement in the model error or a vote of minus one in the opposite case so that $v_i=\theta(\hat{E}(D_i; w^{t-1})-\hat{E}(D_i; w^t))$, where θ is the Heaviside step function. A block is considered valid after being referenced by another block where more than half of the validators have appended a positive vote $$\Sigma_i v_i > \frac{n}{2}.$$

Figure 3:
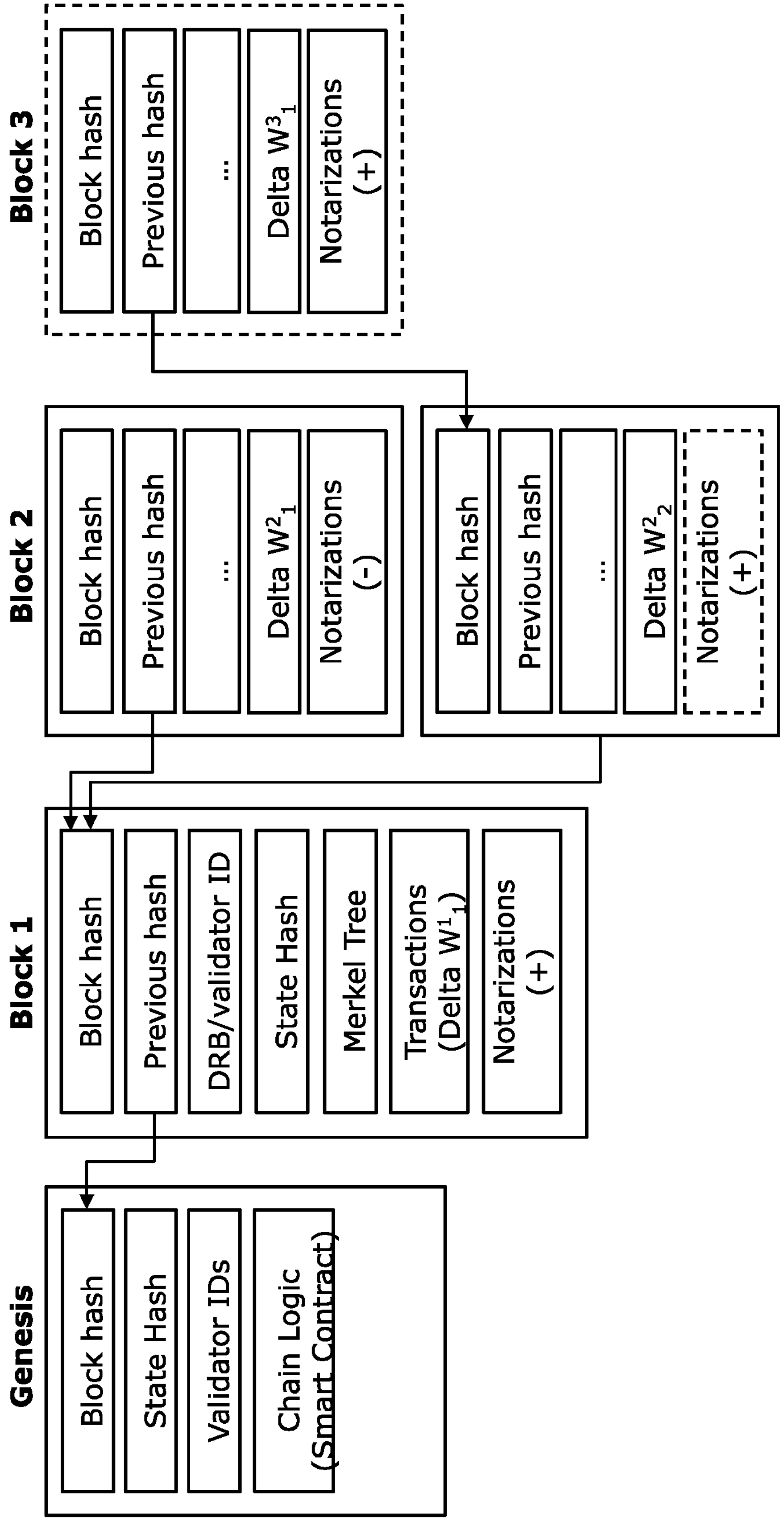
FIG. 3 is a schematic illustration depicting CLSC blockchain data structure and fork selection rules, in accordance with an embodiment of the present disclosure.

In this way the distributed ledger arrangement is evolved such that the updates to the shared global model lead to improved performance for a simple majority of the worker nodes. (In the first round, the validators assess whether the weights, $\Delta w^1$, are drawn correctly from the sampling distribution). FIG. 3 shows this process diagrammatically.

The starting value of the model $w^0$ could be chosen by initiating a ML model by other means such as after training for a certain number of iterations on the validator's local data set. The validators could agree to only store digests or hashes of the updates to the CLSC, $H(\Delta w^t)$ and the updates themselves (potentially redundantly) using IPFS. This would reduce the storage requirements on the validators, who would no longer be required to keep a full record of all updates. In this case, the model updates could also contain the identities of validators that are required to keep a replica of the model update at time t and this activity incentivized either positively (through rewards) or negatively (through penalties for non-compliance).

Each validator could be initialized with a single-party verifiable random function (VRF), and events coordinated by ranking the outputs of the VRF from many parties. Furthermore, Verifiable Delay Functions (VDFs) could be used to space the timing of block production (or block creation) according to the priority of each validator within the committee. Alternatives to the Loss function could be used by the validators to assess Hereinafter the present disclosure describes extensions to ensure privacy. An issue with machine learning is that model updates can be used to extract information about the data that was used to train it. This is mitigated in differential privacy settings by adding noise to either the model or the training data. A complementary approach to this process is to aggregate updates from multiple validators using secret sharing techniques. The above protocol can be extended to this type of setting by using the DRB to elect a subset of the committee to produce the next block.

This sub-committee involves validators performing the role of either trainers or aggregators of the model update. In this mode, each trainer produces a weight update and then sends a shared secret encoding this update to the set of aggregators. The aggregators sum the shares that they receive from each trainer, and publish these in a block. These outputs can in turn be aggregated to give the weight update arising from summing the contributions of all of the trainers. The block published in this way can be notarized (i.e. voted on) in the same way as the earlier protocol. This approach is modular and can be combined with the other learning approaches described in this patent.

Figure 4:
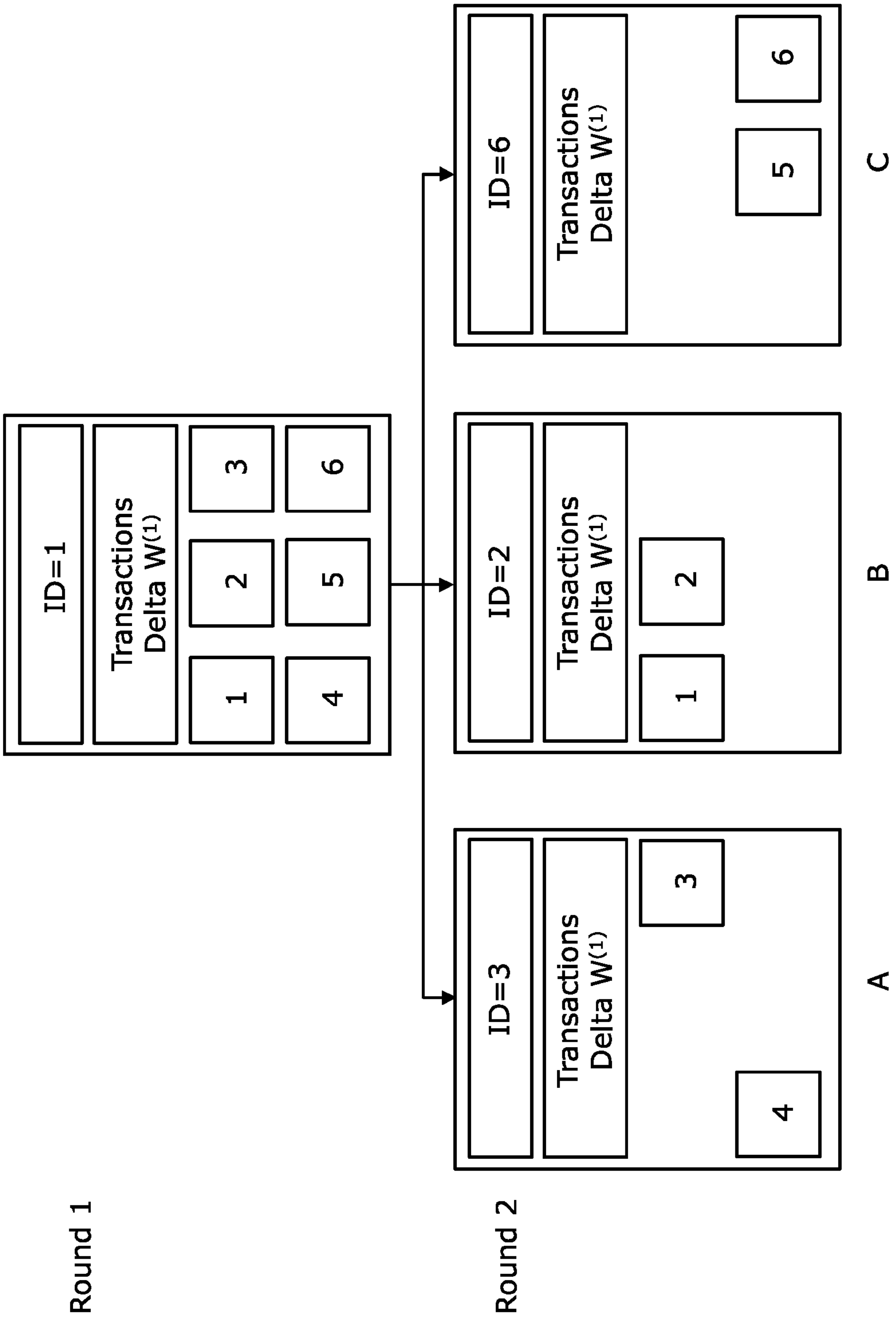
FIG. 4 is a schematic illustration depicting forking for dynamic multi-task learning, in accordance with an embodiment of the present disclosure.

Hereinafter the present disclosure describes an extension to Dynamic Multi-Task Learning. An issue with this version of consensus, is that if there are, for example, three distinct tasks that are each associated with one-third of the members of the committee, the consensus will eventually stall as fewer than one-half of the committee will agree consistently on the quality of model update. This problem can be overcome by altering the consensus rules so that more general tree-like data structures are supported, as illustrated in FIG. 4.

After some period of time, the validators could make the forks permanent by separating the validators into distinct sets running separate chains. This has the benefit of reducing the storage and communication costs. This outcome would need to be accounted for by recording changes to the staking and lock-up state on the parent chain.

Hereinafter the present disclosure describes an extension to Directed Acyclic Graphs (DAGs). An issue with partitioning validators using forks of the distributed ledger arrangement is that there is no mechanism to communicate information between the different branches once a fork has been established. This is likely to be sub-optimal in many situations such as, for example, if branches A and B in FIG. 4 are really attempting to solve the same task, and the stochastic nature of the training process has led to a spurious split into different branches. This might eventually be resolved by all of the validators later returning to one of the branches but would lead to all of the progress of the learning algorithm in the "stale" branch being lost. Another possibility, which is part of the assumption of multi-task learning (MTL), is that another related task might still contain information that is useful for the task at hand even if performance is degraded by forcing the two tasks to share exactly the same ML model.

A mechanism that can overcome both types of issues is to extend the ledger data structure so that it supports Directed Acyclic Graphs (DAGs.) This is a relatively simple modification, which means that blocks can reference more than one of the blocks that precede it. For example, in FIG. 4, a block could be added that unifies branches A and B by referencing both. In general, blocks of this type will represent an operation that unifies the state associated with the two branches that are referenced. This could be as simple as an averaging operation on the two models, which would deal with spurious forks. More complex operations are also possible such as combining the two models using multi-task approaches. These branch-unifying operations could also be voted on using digital signatures with the branches persisting as separate entities if a majority of the validators do not approve of the merge.

The DAG can be built synchronously using the block height parameter to ensure that updates are added at a constant rate. Furthermore, the DAG can also be built partially asynchronously using techniques such as Schelling scheduling. Also, at different points the DAG can be "checkpointed" to coordinate all of the validators within the learning task. This would involve adding a block that unifies the branches of a majority of the validators thereby simplifying and reducing the storage and communication cost of the learning procedure.

Figure 5:
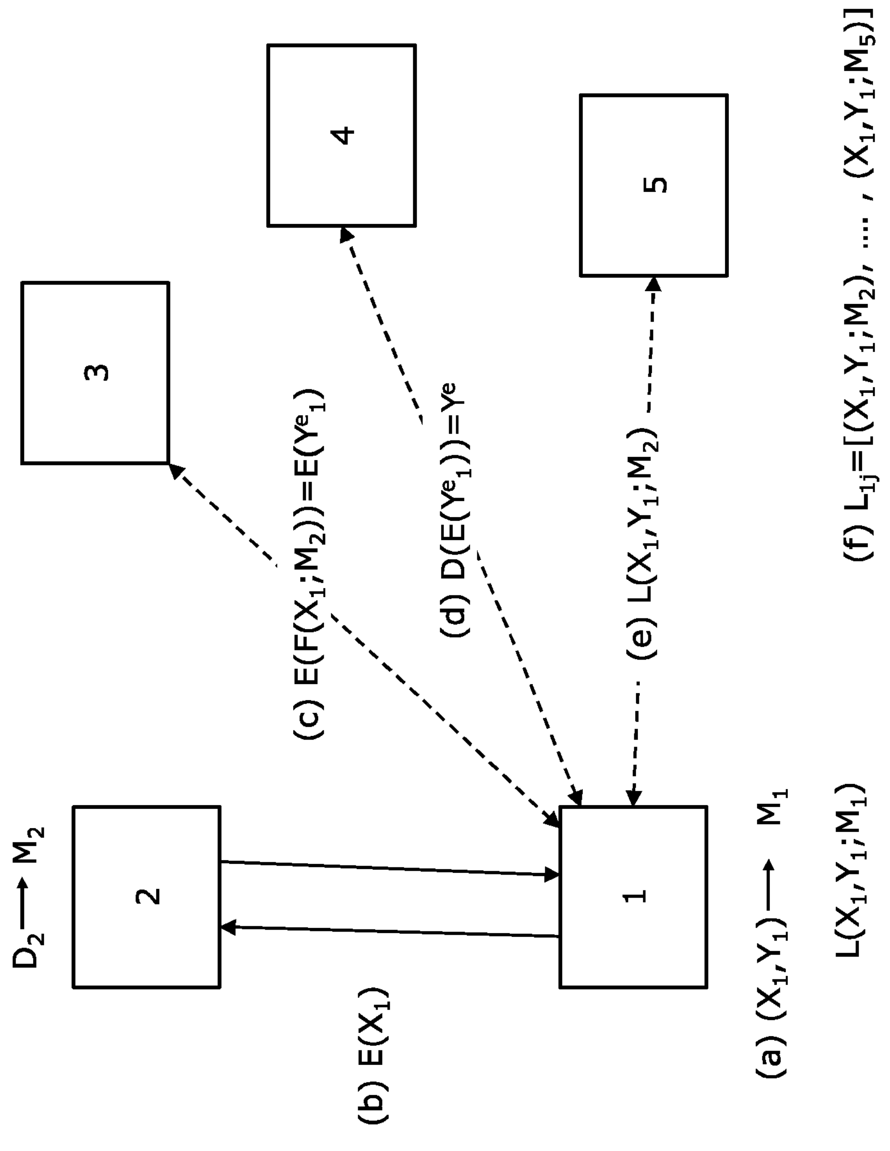
FIG. 5 is a schematic illustration depicting pre-training model clustering using homomorphic encryption, in accordance with an embodiment of the present disclosure.

Hereinafter the present disclosure describes pre-task clustering of validators for multi-task learning. An alternative mechanism to deal with the potential for different tasks being present is to use Homomorphic Encryption (HE) techniques to pre-cluster the worker nodes before starting training to ensure that validators are solving compatible ML problems. This can be achieved by each party first training a ML model on their local data. Any appropriate model can be used for encryption. Preferably, the model is encrypted using the techniques described in Juvekar et al [Juvekar et. al., 2018, *Gazelle: A Low Latency Framework for Secure Neural Network Inference, CoRR*, retrieved from http://arxiv.org/abs/1801.05507]. It is then possible for other worker nodes to encrypt their data and receive predictions from the model in a way that hides both the data from the model provider and the model parameters from the data provider. Using these pair-wise protocols a matrix of model losses can be obtained as shown in FIG. 5.

The losses can be thought of as representing the distance between the data held by a particular validator and the models of the different members of the committee. The loss matrix can therefore be recorded on the distributed ledger arrangement and a smart contract used to perform a clustering of the validators into groups according to the similarity of their data/models. Standard agglomerative, hierarchical, graph-based or other types of unsupervised clustering algorithms would be suitable for this problem. The CLSCs could be initialized with validator clusters identified with this approach and trained using the Byzantine Fault-Tolerant protocol described previously.

The protocol may be vulnerable to the model owners either altering their model when queried by different validators or for them to withhold predictions. It is similarly possible for a data provider to either report an incorrect calculation of the error or also submit different data sets to different models. Both of these types of attack can be mitigated by doing HE in a multi-party computation (MPC) setting where either the data or models are shared between multiple parties in encrypted form, and the error calculation itself is computed using HE. In this scenario, attacks can only be carried out successfully if there is collusion between several parties. The security provided by the DRB ensures that the probability of this attack succeeding decays exponentially with the number of parties that share the data/model.

Unlike the other protocols, mentioned above, this scheme does not require that the validators classify the data using homogeneous models (e.g. neural networks with identical topologies). This protocol can therefore be used to also select model topologies for subsequent stages of the learning process. Furthermore, the configuration of learners and model builders but involving MPC can be used directly to train multi-task learning approaches such as SHAMO (Learning with SHAred MOdels) (Crammer and Mansour (2012) Learning Multiple Tasks using Shared Hypotheses, *NeurIPS*. Rather than use a different distributed ledger arrangement for training the clusters of distinct tasks, an alternative would be to use classical MTL learning to train individual models for each task with additional modifications to account for the task dependencies. Each validator would then provide updates for the model that applies to their cluster while an on-chain learning algorithm computed updates for other clusters in the MTL problem.

DETAILED DESCRIPTION OF THE DRAWINGS

Referring to FIG. 1, there is shown a schematic illustration of collective learning protocol, in accordance with an embodiment of the present disclosure. Following completion of the collective learning protocol, participants are clustered into groups with shared model parameters based on the estimated generalization performance of the shared classifier (namely classifier functions). A classifier is an algorithm, i.e., a mathematical function implemented by a classification algorithm that assigns or maps data into one or more distinct categories. Sets of data may be grouped into a given category according to the classifier algorithm. In FIG. 1, adversaries, represented in the figure as learner 3, can perform arbitrary behaviour to degrade the performance of the collective models of other participants by generating arbitrary data samples, constructing adversarial classifier functions or model updates or failing to comply with other aspects of the protocol. Successful completion of the collective learning task leads to adversaries being excluded from or making negligible contributions to collectively learned models. In the example above, learners 1, 2 and n are all clustered in the same group while the adversary is excluded.

Referring to FIG. 2, there is shown a schematic illustration depicting a collective learning system built using interoperability between a public blockchain and a side chain, in accordance with an embodiment of the present disclosure. Both blockchains are replicated state databases controlled by consensus protocols, which ensure agreement between all validators. The blockchains can be used to store data or encode logic in the form of smart contracts. The public blockchain contains rules for participation including incentives and a mechanism to coordinate the ML problem type and consensus rules. The main chain also keeps track of the holdings of the different participants, the amounts of tokens staked and can also record the block-hashes of the CLSC. This ensures that the CLSC blocks that are recorded in this way have similar security levels to blocks on the main chain. The side chain contains details of the ML model and the different votes and types of contributions made by the different validators. Summaries of this information can also be recorded on the main chain. A relayer serves the purpose of checking finality, or checking or guaranteed safety or consensus of the validator state on each network (namely on each chain) before relaying the information between the chains, wherein the information may be the state of main chain or the state of any side chain. The relayer may communicate DRB values from the main chain. Such DRB values may also be generated locally by the side-chain.

Referring to FIG. 3, there is shown a schematic illustration depicting CLSC blockchain data structure and fork selection rules, in accordance with an embodiment of the present disclosure. The genesis block contains a smart contract for programming the logic of the chain along with a list of validator addresses and public keys (it may also contain shares of a group signature used for constructing a DRB). The first block in the chain contains a representation of the fields within a block. This information is omitted from subsequent blocks. The DRB generates a prioritized queue of validators. The highest-priority validator in the second round produced a block that failed to be notarized by a majority of the committee. Simultaneously, a second validator produced a second block that was successfully notarized and referenced by another notarized block thereby reaching finality. At this point the global model $$w^{(2)} = \Delta w_1^{(1)} + \Delta w_2^{(2)}.$$

Referring to FIG. 4, there is shown a schematic illustration depicting forking for dynamic multi-task learning, in accordance with an embodiment of the present disclosure. In this example, there are six validators with three distinct ML tasks. The validators are ordered according to their task so that validators numbered 1 and 2, are allocated to the first task and so forth. Following the weight initialization update, the first update provided by validator #2 (selected by the random beacon) is only endorsed by validator #1 and leads to generation of branch B. Other validators are then tasked with producing the block according to their priority, as specified by the random beacon, and produce blocks containing alternative weight updates (A and C). These blocks are only notarized by the other validator(s) that share the same task. After being coordinated by the voting scheme, the validators can proceed to append more blocks to each branch using their shared collective ML models.

Referring to FIG. 5, there is shown a schematic illustration depicting pre-training model clustering using homomorphic encryption, in accordance with an embodiment of the present disclosure. This protocol begins in the same configuration as the base scenario with multiple validators in a network with (a) local data$(X_i, Y_i)$ and a ML prediction model $M_i$ for that data and an estimated error or loss $\hat{L}(X_i, Y_i; M_i)$ for the data under the model. In step (b), validator 1 encrypts their data and sends it to validator 2 who processes it using their model and (c) returns the encrypted predictions of the model, in (d) these predictions are decrypted by validator 1 who can thereby estimate (e) the loss or error of validator 2's model on their data set. This process can be repeated for the other validators to compute a vector of losses as in (f). The other validators can also obtain estimates of the model performance on their datasets to build an asymmetric matrix with elements $L_{ij}=\hat{L}(X_i, Y_i; M_j)$. The validators can be clustered into different tasks using the loss matrix.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A distributed computer system to enable training of at least one computing model, the system comprising:

a plurality of worker nodes coupled via a data communication network, each worker node comprising at least one processor and a local database configured to process and store data;

a distributed ledger arrangement configured to coordinate operation of the system;

at least one secondary distributed ledger configured to coordinate collective learning of the plurality of worker nodes; and one or more processors configured to execute instructions to:

cluster the plurality of worker nodes into one or more clusters by:

processing encrypted data associated with the worker nodes using a homomorphic encryption algorithm;

transmitting the encrypted data to at least one other worker node and receiving encrypted model predictions from the at least one other worker node; and determining loss values based on the encrypted data and the encrypted model predictions for use in clustering the plurality of worker nodes;

synchronize, via a cross-ledger validation protocol, records between the distributed ledger arrangement and the at least one secondary distributed ledger;

execute, at the at least one secondary distributed ledger, at least one computer protocol for the collective learning of the plurality of worker nodes; and cause the plurality of worker nodes within a given cluster to train the at least one computing model using information comprised in the at least one secondary distributed ledger, wherein the clustering is performed before starting training of the at least one computing model.

2. The distributed computer system of claim 1, wherein the data processing arrangement is configured to cluster the plurality of worker nodes into one or more clusters based on estimated generalization performance of a shared classifier on a task associated with the worker nodes.

3. The distributed computer system of claim 1, wherein the system is configured to initiate the secondary distributed ledger by employing at least one of: staking of tokens in the distributed ledger, smart contract, off-chain contractual agreements.

4. The distributed computer system of claim 1, wherein each of the secondary distributed ledgers is configured to store cryptographically signed records pertaining to the respective computing model, worker nodes associated therewith, and a contribution of each of the worker nodes in their respective cluster in relation to training the respective computing model.

5. The distributed computer system of claim 1, wherein the data processing arrangement is configured to validate a given block in the distributed ledger arrangement when the given block is referenced by a block that has been notarized by a majority of the plurality of worker nodes.

6. The distributed computer system of claim 1, wherein the data processing arrangement is configured to employ verifiable delay functions to space a timing of block production according to a priority of each worker node within a given cluster.

7. The distributed computer system of claim 1, wherein the one or more processors are configured to apply the homomorphic encryption algorithm to model-update data vectors generated by the plurality of worker nodes prior to transmission of the encrypted data between worker nodes for determining the loss values used in clustering the plurality of worker node.

8. The distributed computer system of claim 1, wherein the one or more processors are configured to generate a matrix of loss values representing model performance across pairs of worker nodes and to cluster the plurality of worker nodes based on the generated matrix of loss values.

9. The distributed computer system of claim 1, wherein the one or more processors are configured to:

transmit encrypted data from a first worker node to a second worker node;

process the encrypted data at the second worker node using a machine learning model associated with the second worker node to generate encrypted model predictions; and transmit the encrypted model predictions to the first worker node.

10. A method for operating a distributed computer system to enable training of at least one computing model, wherein the distributed computer system comprises a plurality of worker nodes that are coupled via a data communication network to exchange data therebetween, each worker node comprising at least one processor and a local database configured to process and store data therein, and wherein operation of the distributed computer system is coordinated by a distributed ledger arrangement, the method comprising:

clustering the plurality of worker nodes into one or more clusters by:

processing encrypted data associated with the worker nodes using a homomorphic encryption algorithm;

transmitting the encrypted data to at least one other worker node and receiving encrypted model predictions from the at least one other worker node; and determining loss values based on the encrypted data and the encrypted model predictions for use in clustering the plurality of worker nodes;

synchronizing, via a cross-ledger validation protocol, records between the distributed ledger arrangement and at least one secondary distributed ledger;

executing, at the at least one secondary distributed ledger, at least one computer protocol for collective learning of the plurality of worker nodes; and training the at least one computing model at the plurality of worker nodes within a given cluster using information comprised in the at least one secondary distributed ledger, wherein the clustering is performed before starting training of the at least one computing model.

11. The method of claim 10, wherein the method comprises clustering the plurality of worker nodes into one or more clusters based on estimated generalization performance of a shared classifier on a task associated with the worker nodes.

12. The method of claim 10, wherein the method comprises initiating at least one secondary distributed ledger by employing at least one of: staking of tokens in the distributed ledger arrangement, smart contract logic, off-chain contractual agreements.

13. The method of claim 10, wherein each of the secondary distributed ledgers stores cryptographically signed records pertaining to the respective computing model, worker nodes associated therewith, and a contribution of each of the worker nodes in the respective cluster to train the respective computing model.

14. The method of claim 10, wherein the method comprises validating a given block in the distributed ledger arrangement when the given block is referenced by a block that has been notarized by a majority of the plurality of worker nodes.

15. The method of claim 10, wherein the method comprises employing verifiable delay functions to space a timing of block production according to a priority of each worker node within a given cluster.

16. The method of claim 10, further comprising checking finality of the distributed ledger arrangement and the at least one secondary distributed ledger and relaying the information between the distributed ledger arrangement and the at least one secondary distributed ledger.

17. The method of claim 10, further comprising generating a matrix of loss values representing model performance across pairs of worker nodes and clustering the plurality of worker nodes based on the generated matrix of loss values.

18. The method of claim 10, further comprising:

transmitting encrypted data from a first worker node to a second worker node;

processing the encrypted data at the second worker node using a machine learning model associated with the second worker node to generate encrypted model predictions; and transmitting the encrypted model predictions to the first worker node.

* * * * *